(12) United States Patent
Ma et al.

(10) Patent No.: US 11,346,430 B2
(45) Date of Patent: May 31, 2022

(54) MECHANICAL ADAPTER TO TRANSFER MOTION FROM ROTATIONAL TO SWINGING VIA A SLOTTED CAM STRUCTURE

(71) Applicants: Xudong Ma, Huzhou (CN); Feimo Shen, Milpitas, CA (US)

(72) Inventors: Xudong Ma, Huzhou (CN); Feimo Shen, Milpitas, CA (US)

( * ) Notice: Subject to any disclaimer, the term of this patent is extended or adjusted under 35 U.S.C. 154(b) by 87 days.

(21) Appl. No.: 16/833,615

(22) Filed: Mar. 29, 2020

(65) Prior Publication Data

US 2021/0301908 A1    Sep. 30, 2021

(51) Int. Cl.
*A61C 1/05*      (2006.01)
*F16H 25/16*    (2006.01)
*A61C 17/00*    (2006.01)

(52) U.S. Cl.
CPC .............. *F16H 25/16* (2013.01); *A61C 1/05* (2013.01); *A61C 17/005* (2013.01)

(58) Field of Classification Search
CPC .......... F16H 25/16; A61C 1/05; A61C 17/005
USPC ................. 433/122; 74/25, 54, 567
See application file for complete search history.

(56) References Cited

U.S. PATENT DOCUMENTS

| | | | | |
|---|---|---|---|---|
| 558,443 A | * | 4/1896 | Wall ........................ | A61C 1/07 433/122 |
| 1,694,961 A | * | 12/1928 | Basler ..................... | F16H 25/16 74/54 |
| 1,943,118 A | * | 1/1934 | Verena ..................... | F16K 31/53 91/262 |
| 3,083,946 A | * | 4/1963 | Kern, Jr. ................. | B23B 45/04 415/202 |
| 3,248,792 A | * | 5/1966 | Staunt ...................... | A61C 1/05 433/99 |
| 3,349,490 A | * | 10/1967 | Lieb ......................... | A61C 1/14 433/105 |
| 3,678,934 A | * | 7/1972 | Warfield ................ | B23D 51/18 606/79 |
| 4,341,519 A | * | 7/1982 | Kuhn ....................... | A61B 9/00 433/121 |
| 4,371,341 A | * | 2/1983 | Nakanishi ................ | A61C 1/07 433/118 |
| 4,460,341 A | * | 7/1984 | Nakanishi ................ | A61C 1/07 433/122 |
| 5,363,711 A | * | 11/1994 | Seto ...................... | B27B 19/006 30/500 |
| 5,911,577 A | * | 6/1999 | Henrikson ........... | A61C 17/005 433/125 |

(Continued)

FOREIGN PATENT DOCUMENTS

CN      102551907 A *   7/2012
DE      10030114 A1 * 12/2001 ............. A61C 1/185

(Continued)

*Primary Examiner* — Jacqueline T Johanas
*Assistant Examiner* — Holly T. To

(57) ABSTRACT

A mechanical rotational-swinging adapter is provided to transfer a continuous rotational input from a driving tool into back-and-forth swinging output via a slotted cam structure. When the rotational-swinging adapter is installed between the nosecone and the air motor of a conventional dental handpiece, the nosecone outputs the back-and-forth swinging movement for dental work such as root canal or prophylaxis treatments.

8 Claims, 6 Drawing Sheets

(56) References Cited

U.S. PATENT DOCUMENTS

| | | | | |
|---|---|---|---|---|
| 6,964,076 | B2 * | 11/2005 | Zhuan | A61C 17/3418 15/22.1 |
| 9,398,938 | B2 * | 7/2016 | Rek | A61C 15/048 |
| 2004/0180307 | A1 * | 9/2004 | Graham | A61C 17/16 433/118 |
| 2008/0176181 | A1 * | 7/2008 | Putz | A61C 1/00 433/29 |
| 2008/0220392 | A1 * | 9/2008 | Carron | A61C 17/005 433/125 |
| 2010/0286694 | A1 * | 11/2010 | Rio | A61B 17/1631 606/80 |
| 2012/0258418 | A1 * | 10/2012 | Shen | A61C 17/005 433/29 |
| 2019/0247050 | A1 * | 8/2019 | Goldsmith | A61B 17/00491 |

FOREIGN PATENT DOCUMENTS

| | | | | | |
|---|---|---|---|---|---|
| EP | 1825143 | B1 | * | 2/2009 | F04B 45/047 |
| JP | 59080559 | A | * | 5/1984 | F16H 25/16 |
| WO | WO-2014187841 | A2 | * | 11/2014 | A61B 17/1631 |
| WO | WO-2018002906 | A1 | * | 1/2018 | A61C 1/088 |

* cited by examiner

MECHANICAL ADAPTER TO TRANSFER MOTION FROM ROTATIONAL TO SWINGING VIA A SLOTTED CAM STRUCTURE

CROSS-REFERENCE TO RELATED APPLICATIONS

U.S. Patent Documents

| Pat. No. | Published Date | Inventors | Current U.S. Class |
| --- | --- | --- | --- |
| 9,398,938 | Jul. 26, 2016 | Rek | 433/125; 433/118; 433/126; 433/127 |
| 6,964,076 | Nov. 15, 2005 | Zhuan | 15/22.2; 15/22.1; 433/118; 433/122 |
| 6,247,931 | Jun. 19, 2001 | Postal et al | 433/118; 433/122; 433/125 |
| 5,931,672 | Aug. 3, 1999 | Postal et el | 74/54; 74/569; 433/122; 433/125 |
| 5,822,821 | Oct. 20, 1998 | Sham | 15/22.1; 15/23 |
| 4,460,341 | Jul. 17, 1984 | Nakanishi | 433/122; 433/125 |
| 4,371,341 | Feb. 1, 1983 | Nakanishi | 433/118; 433/122; 433/127; 433/124 |
| 4,341,519 | Jul. 27, 1982 | Kuhn et al | 433/122; 433/121 |
| 3,967,380 | Jul. 6, 1976 | Malata | 32/27; 32/57; v279/1 |
| 2012/0258418 | Oct. 11, 2012 | Shen | 433/29; 433/122; 433/82 |

BACKGROUND OF THE INVENTION

(1) Field of the Invention

The present invention relates to a mechanical rotational-swinging adapter to be installed between the nosecone and the air motor of an off-the-shelf dental handpiece to transfer a continuous rotational input into a back-and-forth swinging output via a slotted cam mechanism.

(2) Description of Related Art

A conventional dental handpiece can be used for tooth applications such as dental bur-drilling, root canal treatment, or dentin surface prophylaxis of a tooth. A nosecone is secured on a dental power tool such as a dental air-motor. The continuous rotation is thereby transferred from the power tool's driving input directly to the nosecone output.

This conventional dental handpiece has several drawbacks. First, the continuously rotational output from the nosecone is good for bur-drilling, but not ideal for root canal treatment or tooth surface polishing. Second, as opposed to swinging rotation, the continuous rotation in prophylaxis treatment tends to splatter the prophy paste during operation. Third, the continuous rotation for the nosecone may cause overapplying of abrasion to the dental surfaces and is noisier than the swinging movement.

Previous published patents improved the rotation-to-swinging transfer mechanism.

U.S. Pat. Nos. 6,964,076 and 5,822,821 disclose a transmission assembly which converts continuously rotational movement, through a straight slot inside a cam, into a rotational reciprocating movement to achieve an oscillatory output. However since the slots in those patents are straight, the duration of the cam forward stroke is longer than the backward stroke, and the speed the forward and backward strokes are also different, resulting uneven output. In other words, the reciprocation will go faster in one direction than the other. Moreover, the complicated gear-transfer mechanisms in those patents limit the cam slot size.

U.S. Pat. Nos. 3,967,380, 4,341,519, 4,371,341 and 4,460,341 disclose the reciprocating transmission by a connection of a guide rolling rod, which is eccentrically located on the end of a rotatable driving shaft, to a longitudinal guide bore on the cylindrical surface of a reciprocally driven rotor. The contact inter-engaging surface of the driven rotor could be straight or concave. The rotatable driving shaft provides a radial torque of the return stroke to the longitudinal bore which accepts a loose and slidable insertion of the rolling rod, coupling the continuous rotation of the driving shaft to a reciprocating swing of the driven rotor to achieve an oscillating output. The torque of a guide rolling rod is too weak for applications that require powerful strokes.

Based on the reciprocating transmission by inserting a guide rolling rod into a longitudinal guide bore in the previous patents, U.S. Pat. Nos. 6,247,931 and 5,931,672 developed a similar but different transmission by using an inter-engaging cam connection instead of the rod-bore connection. The camming surfaces are shaped with alternating hills and valleys to ensure a continuous contact during operation. However the complicated cam curvature results in production cost disadvantage.

U.S. Pat. No. 9,398,938 discloses a dental device which uses a longitudinal cavity suitable for coaxially holding a driving shaft, and a transversal cavity, arranged with an axis incident with the axis of the longitudinal cavity, to transfer a rotational movement of a driving shaft into oscillating movement of a driven holder. Nevertheless the complicated cam-transferring application and the small driving shaft diameter limit the size of the driven holder so that the driving torque will not be large enough for some tooth treatments.

BRIEF SUMMARY OF THE INVENTION

There are six major aspects of this invention that address the drawbacks of current technology.

The first aspect is a mechanical rotational-swinging adapter that transfers a continuous rotation from a powered rotational driving tool as an input into a back-and-forth swinging movement to a driven tool as an output through a transferring cam with an internal slot.

The second aspect is that this rotational-swinging adapter applies to a conventional dental handpiece that consists of an air-motor at the input end and a nosecone at the output end, so that the continuous rotation of the air-motor is transferred into a back-and-forth swinging movement of the nosecone, and moreover extending to other similar devices that need the swinging motion treatments. Furthermore, the diameter of the cylindrical adapter body is equal to the diameters of the nosecone and the air motor such that when assembled, the assembly forms an extended cylindrical handpiece with a uniform and continuous surface.

The third aspect is that the transferring cam has an internal slot that consists of a base input portion and a lobe output portion. The slot's overall contour has a straight section, a notch near the center of the input portion, and a curved section toward the output portion. This shape ensures equal duration and speed for the forward half cycle and the backward half cycle of the output swing motion when it is driven by a continuously rotating input rod.

The fourth aspect is that the internal slot of the transferring cam is shared by an input pin and an output pin. The input portion of the slot fits the input pin on the input shaft and the output portion fits an output pin on the swing plate which connects the swinging output shaft. Both the input and output pins slide along and share the internal cam slot.

The fifth aspect is that the internal cam slot in the transferring cam is shaped such that the transferring cam experiences the same swinging motion no matter whether the rotation of the air-motor is clockwise or counterclockwise.

The sixth aspect is that for the conventional dental handpiece, this rotational-swinging adapter is an optional element that can be easily attached and detached from the connection between the air-motor and the nosecone. It is a feature that can be added or removed conveniently from a dental tool.

Other details and features of the invention will be pointed out hereinafter.

BRIEF DESCRIPTION OF THE DRAWINGS

The invention will be further described in conjunction with the attached drawings:

FIG. 5A shows the starting position of the first quadrant in the cam movement cycle with the off-axis input pin and the off-axis output pin. FIG. 5B, FIG. 5C and FIG. 5D show the starting positions of the consecutive second, third, and fourth quadrants, respectively.

DETAILED DESCRIPTION OF THE INVENTION

Figure 1:
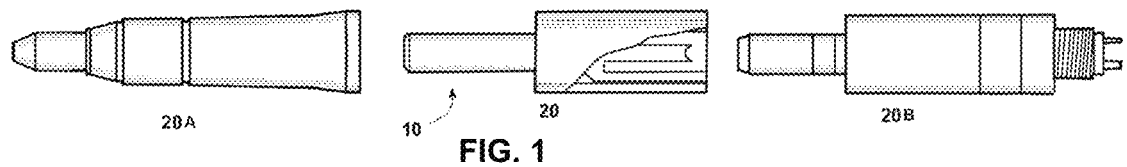
FIG. 1 is a perspective view of a dental handpiece that has a rotational-swinging adapter between the driving air-motor and the driven tool nosecone of a conventional dental handpiece. The diameter of the cylindrical adapter body is equal to the diameters of the nosecone and the air motor such that when assembled together, the assembly forms a uniform new cylindrical handpiece as an entity.

FIG. 1 is a perspective view of the three main parts of a dental handpiece 10. In the middle is a rotational-swinging adapter 20 with a partial cross-sectional view at its input side. It is designed to insert into a standard driven nosecone 20A. A standard driving rotational air-motor 20B inserts its chuck into the dental handpiece 10. The diameter of the cylindrical rotational-swinging adapter body is equal to the diameters of the nosecone and the air motor.

Figure 2:
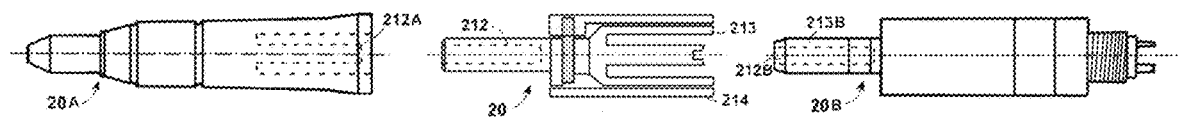
FIG. 2 is a longitudinal cross-sectional view of the dental handpiece in FIG. 1, showing its basic internal structures.

FIG. 2 is a longitudinal cross-sectional view of the handpiece 10 in FIG. 1, showing the basic structure of the rotational-swinging adapter 20 and how it connects to the nosecone 20A and the air-motor 20B to form an assembly. The rotational-swinging adapter 20 consists of a housing 214, a rotational input shaft 213, a transferring cam 211, and an output shaft 212. The rotational input shaft 213 accepts the chuck 213B of the air-motor 20B, while the output shaft 212 fits the input end of the nosecone 20A. The chuck 213B of the air-motor 20B has a driving-hollow 212B that matches the rotational input shaft 213 and accepts the continuous rotation of the air-motor 20B. The output shaft 212 of the rotational-swinging adapter 20 matches an accepting-hollow 212A at the input end of the nosecone 20A.

Figure 3:
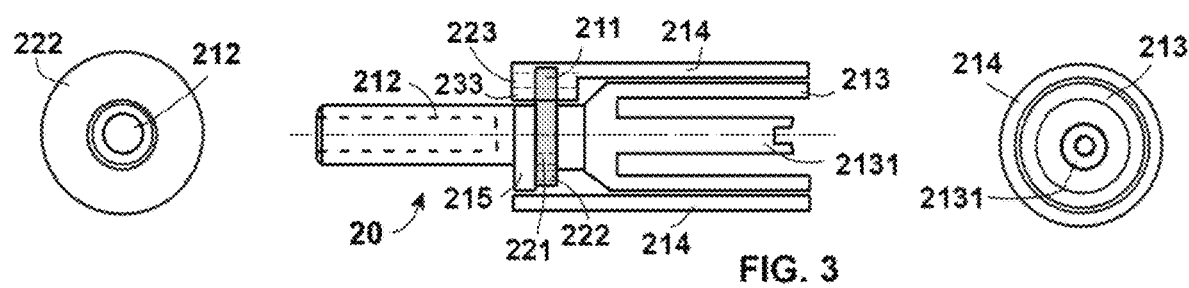
FIG. 3 shows the details of the rotational-swinging adapter in FIG. 2 as a longitudinal cross-sectional view and its left and right-side views.

FIG. 3 shows the details of the rotational-swinging adapter 20 in FIG. 2, with its left-side view and right-side view. The transferring cam 211 is in between the rotational input shaft 213 and output shaft 212 with the adaptor's housing 214 containing the input shaft 213 and the transferring cam 211. The adaptor's housing 214 extends interiorly to a seat 233, which has a cam pivot post 223 in the center. The transferring cam 211 swings around the axis of the cam pivot post 223. The rotational input shaft 213 consists of an outer shell with a central rod 2131. The central rod 2131 has a transverse slot for accepting the transverse ridge of the motor chuck 213B of the air-motor 20B. The motor chuck 213B matches the shape of the rotational input shaft 213. The transferring cam 211 is driven by an off-axis input pin 221 which stems out near the perimeter of the rotational input shaft 213. When the rotational input shaft 213 rotates, the transferring cam 211 is driven to swing back-and-forth around the axis of the cam pivot post 223.

The output section consists of the shaft 212, a driven swing cam 215, and an off-axis output pin 222 that stems perpendicularly from the face of the driven swing cam 215 at its bottom edge. The output shaft 212 is co-axial with the rotational input shaft 213. With the transferring cam and the driven swing cam 215 working side-by-side, the mechanism transfers the continuous rotation of the input shaft 213 to a swinging output at output shaft 212.

Figures 4A, 4B:
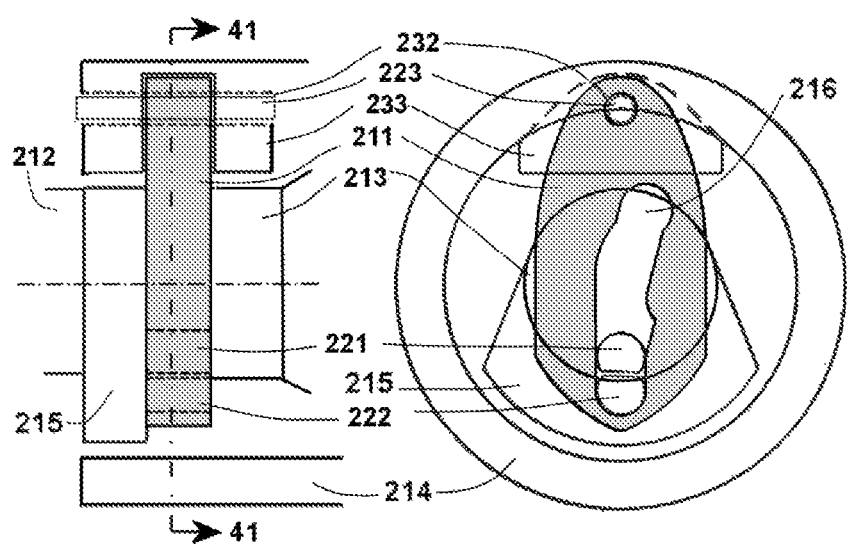
FIG. 4A is the part of the longitudinal cross-sectional view of rotational-swinging adapter in FIG. 3, illustrating the internal parts for transferring a continuous rotation from the input shaft into a swinging movement on the output shaft. It shows a transferring cam and a curvilinear slot inside it.
FIG. 4B is the cross-sectional view of FIG. 4A taken along line 41-41 which transversely passes through the transferring cam.

FIG. 4A is the cross-sectional view of the elements inside the rotational-swinging adapter 20. FIG. 4B shows the orthogonal cross-sectional view to FIG. 4A passing through the transferring cam 211. The transferring cam 211 internally contains a curvilinear slot 216 that extends from the cam base to cam lobe. At the top part of the seat 233, there is a cam pivot-hole 232 whose axis is parallel to the input and output axes. The cam pivot post 223, the cam pivot-hole 232, and cam bore form a slip-fit so that, after assembly, the transferring cam 211 swings with low friction.

The continuous rotation as an input is transferred into the back-and-forth swinging as an output via a slotted cam mechanism. When in motion, the off-axis input pin 221 of the rotational input shaft 213 slides in the input portion of the curvilinear slot 216. This portion is the cross-sectional circular area that the rotational input shaft 213 covers. The rotation of the input shaft 213 causes the off-axis pin 221 to slide inside the curvilinear slot 216 and drive the transferring cam 211 to swing around the cam pivot post 223. On the output side, the off-axis output pin 222 also slides inside the curvilinear slot 216 but in its output portion. This portion is outside of the cross-sectional circular area that the rotational input shaft 213 covers. Hence the movement of the transferring cam 211 is transferred into the swinging movement of the output shaft 212. Because of the coaxial alignment of the input and out shafts, the continuous rotation at the input side and the swinging movement at the output side are along the central axis of the rotatory-swinging adapter 20. All three pieces: air-motor 20B, rotational-swinging adapter 20, and nosecone 20A form a contiguous device.

FIG. 5A, FIG. 5B, FIG. 5C and FIG. 5D are cross-sectional views of the rotational-swinging adapter 20 to show four snapshots of the continuous rotation that is transferred into the back-and-forth swinging. The four snapshots represent the four quadrants of a complete cycle of the cam movement. The cycle is driven by the rotational input shaft 213 that rotates 360 degrees clockwise in the views.

Figure 5A:
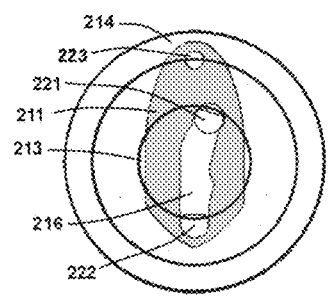
FIG. 5A, FIG. 5B, FIG. 5C and FIG. 5D are a set of transverse cross-sectional views passing the transferring cam to show the four quadrants of the cam movement cycle.
Figure 5B:
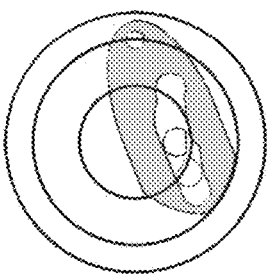
Figure 5C:
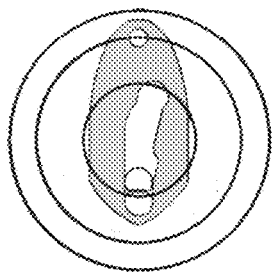
Figure 5D:
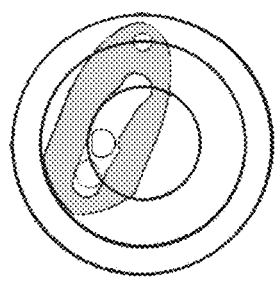
Figure 6A:
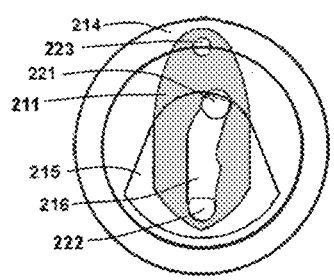
FIG. 6A, FIG. 6B, FIG. 6C and FIG. 6D match the positions of the four quadrants shown in FIGS. 5A, 5B, 5C, and 5D, respectively, but with a driven swing plate outlined. The off-axis input pin and the off-axis input pin share the internal cam slot. These figures illustrate how the transferring cam transfers a continuous rotation of the rotational input shaft into a back-and-forth movement of the swing plate of the output shaft.
Figure 6B:
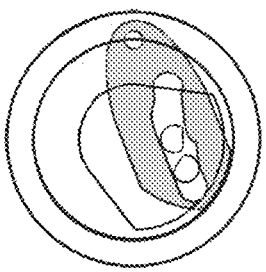
Figure 6C:
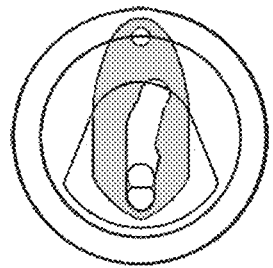
Figure 6D:
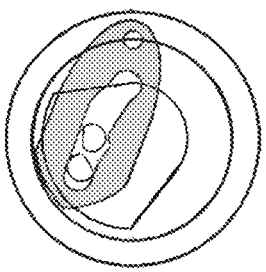

The first quadrant is shown in FIG. 5A where the off-axis input pin 221 just passes the 12 o'clock position. With the curvilinear slot 216 contoured, the off-axis input pin 221 moves clockwise and pushes the curvilinear slot 216 to the right, causing the transferring cam 211 to swing to the right about the cam pivot post 223. When the end is reached, such as the second quadrant shown in FIG. 5B, the off-axis input pin 221 starts to slide downward along the contour of the curvilinear slot 216, causing the transferring cam 211 to change swing direction from right to left. The off-axis input pin 221 continues rotating and reaches the 6 o'clock position in the third quadrant as shown in FIG. 5C. Here the transferring cam 211 is swung back to the same position as in the first quadrant. The off-axis input pin 221 continues its course to the 9 o'clock position and drives the transferring cam 211 to swing to the left most position as shown in FIG. 5D. At this moment, the off-axis input pin 221 starts to slide upward along the contour of the curvilinear slot 216, causing the transferring cam 211 to change swing direction from left to right. As the off-axis input pin 221 finishes the cycle, all parts return to what's shown in FIG. 5A. Then the next cycle repeats.

The shape of the curvilinear slot 216 of the transferring cam 211 is curved instead of straight at the input portion. There is a notch at its midway on the right-hand side. This design gives equal duration and even angular speed for the left swing versus the right swing of the transferring cam 211. It improves upon the weakness of the conventional straight slot cam that causes swinging in one direction takes much longer time than the other direction.

If the rotational input shaft 213 rotates counter-clockwise, the swinging of the transferring cam 211 is achieved identically with the only difference being the direction of motion is reversed. Therefore the swinging movement of the transferring cam is independent of the rotation direction of the air-motor 20B.

FIG. 6A, FIG. 6B, FIG. 6C and FIG. 6D match the sequence of FIG. 5A, FIG. 5B, FIG. 5C and FIG. 5D to show the swinging movement of the driven swing cam 215 with its cross-section outlined. They illustrate that the swinging of the transferring cam 211 drives the swing cam 215 by the curvilinear slot 216 pushing on the off-axis output pin 222. The driven swing cam 215 is coaxial with the output shaft 212 so that the driven swing cam 215 swings about the same axis as the output shaft 212. Its swing angle is larger than that of the transferring cam 211.

The objectives of the invention are achieved by the design as shown above. Although specific examples of the present invention and its application are set forth herein, they are not intended to be exhaustive or limiting of the invention. These illustrations and explanations are intended to acquaint others skilled in the art with the invention, its principles, and its practical applications, so that others skilled in the art may adapt and apply the invention in its numerous forms, as may best suit the requirements of a particular use.

We claim:

1. A mechanical cylindrical rotational-swinging adapter comprising a rotational input shaft having an off-axis input pin, a swinging output shaft having an off-axis output pin, and a slotted cam mechanism comprising a transferring cam with a shared slot therein, wherein when the adapter is installed between a nosecone and an air motor of a dental handpiece, the adapter functions to transfer a continuous rotational input from said air motor to a back-and-forth swinging output at said nosecone; wherein the transferring cam comprises a cam pivot post inside a slip-fit bore to allow pivoting of the transferring cam in the direction normal to the longitudinal axis of the rotational input shaft, and wherein the off-axis input pin and the off-axis output pin slide in the shared slot during operation.

2. The rotational-swinging adapter of claim 1, wherein a diameter of said cylindrical rotational-swinging adapter is equal to the diameters of said nosecone and said air motor such that when assembled, the assembly forms an extended cylindrical handpiece with a uniform and continuous surface.

3. The rotational-swinging adapter of claim 1, wherein the shared slot comprises: (a) a path for the off-axis input pin of the rotational input shaft, the rotational input shaft configured to connect to the air motor at one end of the adapter, and (b) a path for the off-axis output pin of the swinging output shaft, the swinging output shaft configured to connect to said nosecone at the opposite end of the adapter.

4. The rotational-swinging adapter of claim 1, wherein the shared slot comprises: (a) base portion for continuous rotational input which is driven by the off-axis input pin stemmed from the rotational input shaft, (b) a lobe portion for the back-and-forth swinging output, which drives the off-axis output pin stemmed from the back-and-forth swinging output shaft, and (c) a shared overlap of the two portions for both said off-axis input pin and said off-axis output pin to slide inside the shared slot during operation without interference.

5. The rotational-swinging adapter of claim 1, wherein the shared slot comprises a base portion allowing the off-axis input pin to complete a revolution about the longitudinal axis of said rotational input shaft, and a lobe portion allowing the transferring cam to complete a back-and-forth swinging cycle in synchrony.

6. The rotational-swinging adapter of claim 1, wherein the shared slot comprises, in the direction from a base portion of the shared slot towards a lobe portion of the shared slot: (a) curved half section, (b) a straight half section, and (c) a notch on an inner curve profile of the shared slot where said curved and straight half sections meet to achieve even speed and displacement between forward and backward halves of a back-and-forth swing cycle.

7. The rotational-swinging adapter of claim 1, wherein the shared slot comprises a curved profile configured to output an identical back-and-forth swinging movement of the swinging output shaft regardless of the direction of rotational input from the rotational input shaft.

8. The rotational-swinging adapter of claim 1, wherein said back-and-forth swinging output is applied to the swinging output shaft which is configured to be coupled with an applicator which requires such swinging movement in dental root canal and prophylaxis treatments.

* * * * *